Dec. 9, 1958  H. R. CHAPIN ET AL  2,863,617
SPINNING TYPE FISHING REEL
Filed July 20, 1955  5 Sheets-Sheet 3

INVENTORS.
Howard R. Chapin
Freddie E. Kintanar
BY Nathan N. Kraus
Frank H. Marks
ATTORNEYS United States Patent Office 2,863,617
Patented Dec. 9, 1958

2,863,617

SPINNING TYPE FISHING REEL

Howard R. Chapin, Park Ridge, and Freddie E. Kintanar, Chicago, Ill., assignors, by mesne assignments, to Sears, Roebuck and Co., Chicago, Ill., a corporation of New York Application July 20, 1955, Serial No. 523,190

8 Claims. (Cl. 242—84.21)

This invention relates to a spinning type fishing reel.

One of the objects of this invention is the provision of a spinning type level-wind fishing reel in which recovery of the line is effected through winding the line upon an axially reciprocating spool by a line guide member revolving about the spool.

Another object of our invention is the provision of a fishing reel of the foregoing type in which the line guide member is automatically moved to line-engaging or pickup position upon rotation of the crank of the reel in a forward direction to retrieve the line, and is moved to retracted or non-engaging position by a slight rotation of the crank in a reverse direction to free the line for casting purposes.

Another object of this invention is the provision of a fishing reel of the foregoing type in which the line-engaging member may be manually selectively moved to retracted non-engaging position apart from its actuation by operation of the crank of the reel.

Another object of this invention is the provision of an improved reel of the foregoing type having a spring-urged line-engaging member which, when actuated upon a reverse rotation of the crank, always assumes the same line-disengaging position below the spool and out of interference with the path of travel of the crank or the line.

A further object of this invention is the provision of means affording resistance to reverse rotation of the crank, thereby preventing inadvertent movement of the line-engaging member to disengaging position.

Still a further object of this invention is the provision in a reel of the foregoing type of improved braking means, readily adjustable, to effect a desired degree of braking action on the spool to resist its rotation, as when the line is being retrieved, the adjustment being determined in accordance with the tensile strength of the line employed, so that the spool will rotatably yield to a pull on the line slightly below the point at which the line being used would fail.

Still a further object of this invention is the provision of means automatically producing an audible signal, such as a clicking sound, to indicate to the fisherman that the spool is rotating under the influence of tension on the line.

Still a further object of this invention is the provision of improved means for effecting axial adjustment of the spool to obtain a desired lay of line on the spool.

A further object of this invention is the provision of a crank which is in positive engagement with the drive shaft and which may be selectively moved to a compact storage position.

Still a further object of this invention is the provision in a fishing reel of the foregoing type of mechanism operatively effective even when the reel is held in unusual positions.

A further object of this invention is the provision of a spinning reel of the foregoing type, which is simple and durable in construction and readily assembled and disassembled for cleaning and repair purposes.

Further objects and advantages of this invention will become apparent from the following description when considered in connection with the accompanying drawings, in which.

Figures 1, 2, 6, 7:
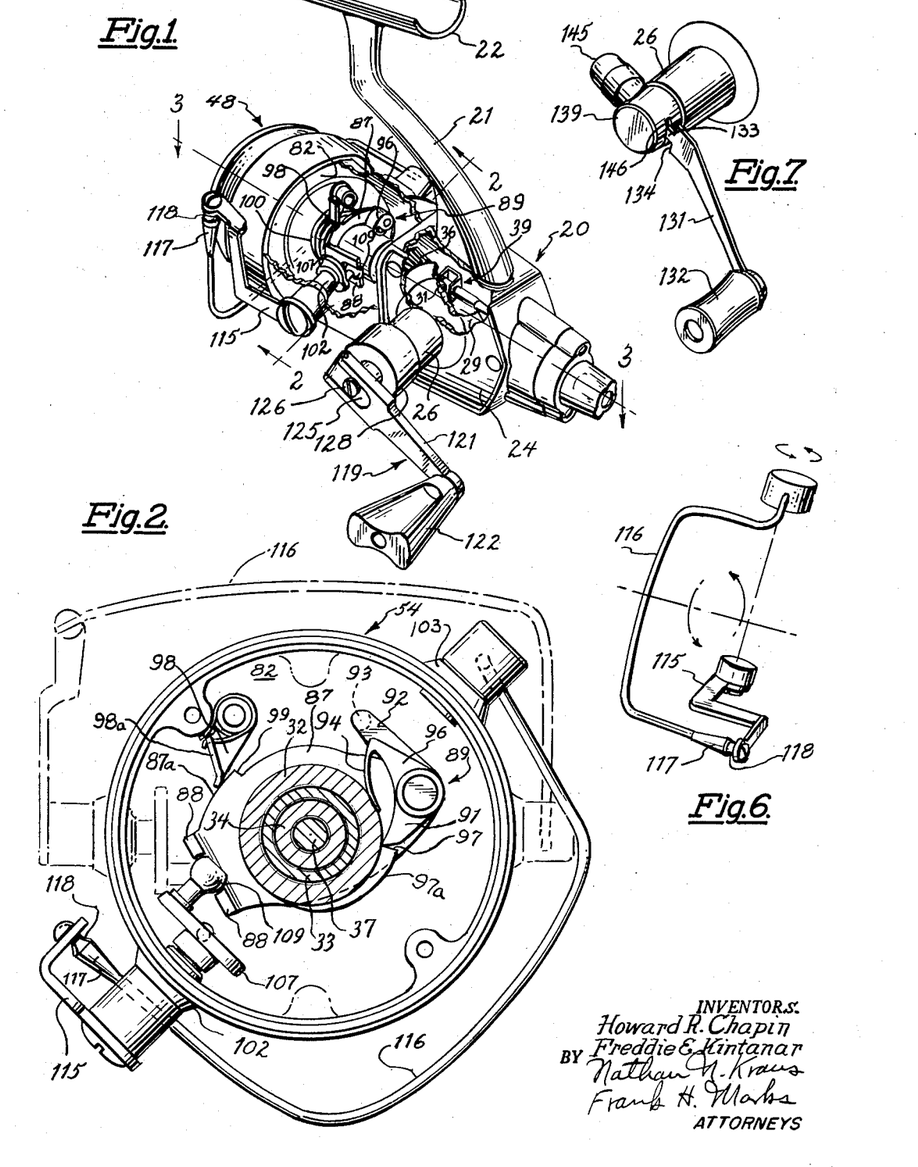
Fig. 1 is a perspective view of a fishing reel in accordance with our invention, with certain parts broken away to show details of construction.
Fig. 2 is a cross-sectional view, on an enlarged scale, taken substantially on line 2—2 of Fig. 1.
Fig. 6 is a perspective view of the line guide assembly.
Fig. 7 is a perspective view of the crank assembly illustrated in Fig. 3, showing the crank arm moved out of normal operating position.

Referring to the drawings, Fig. 1, our invention comprises a housing 20 shaped substantially as illustrated and provided with an integral upwardly extending arm 21 terminating in a mounting member 22 adapted to be secured to the underside of a fishing rod in the usual manner. The housing is provided on one side thereof with a removable cover plate 23. To the other side of the housing there is removably secured a cover plate 24 formed with an integral boss 26 in which is received a bushing 27 in which is journalled a drive shaft 28. Fixed on the end of the said shaft is a drive gear 29 provided with a boss 31 eccentric to the axis of rotation of the gear. The housing 20 includes a forward extension 32 provided with a flanged sleeve bearing 33 in which is journalled a tubular shaft 34 having an integral spur gear 36 at one end adapted to mesh with the drive gear 29.

A spool shaft 37 is supported in the sleeve bearing for rotation and reciprocation and is provided with a pair of spaced annular grooves 38 which cooperate with a yoke member 39 presently to be described. The said yoke member is of generally channel construction, preferably formed of resilient metal. The top web of the member 39 is cut away at its center portion as at 41 (Fig. 9), and the side walls of the said member are provided with aligned recesses 42, the marginal edges of which engage in the annular grooves 38 of the shaft. The said yoke member is thus locked to the shaft 37 in the manner illustrated in the drawings. The walls of the channel yoke member are arranged in confronting relation to the face of the drive gear 29 and straddle the boss 31 thereon. As will be apparent when the drive gear 29 is rotated, reciprocation of the spool shaft 37 is effected. A portion 43 of the surface of the spool shaft 37 is serrated medially between the annular grooves 38, and these serrations are engaged by a spring finger 44 which is secured to the yoke member 39. Thus, should the shaft 37, which is normally non-rotatable, be rotated as will be hereinafter explained, an audible signal or clicking sound is produced. The forward end of the shaft 37 is provided with opposed milled flats 46 and terminates in a threaded portion 47.

A line spool 48 (Fig. 3) is supported on the end of the shaft 37, as will be presently explained. The said spool includes forward and rearward flanges 49 and 51, respectively, the confronting inner walls of which taper outwardly from the hub portion 52. The maximum spacing between said walls is slightly less than the axial travel of the spool shaft 37. Accordingly, when the line is distributed in the space between the flanges, as will be hereinafter explained, the line is laid with a greater accumulation near the flanges than elsewhere, resulting in a concave contour. As the space between the flanges increases, compactness of line-lay is maintained with gradual flattening-out of the line-lay to approximately level condition when the spool is full. Thus, with no loose or open wound areas on the spool near the flanges, as in prior art devices, the possibility of any loops becoming embedded while on the reel during tension on the line, with consequent snarling, is eliminated.

Figures 3, 9:
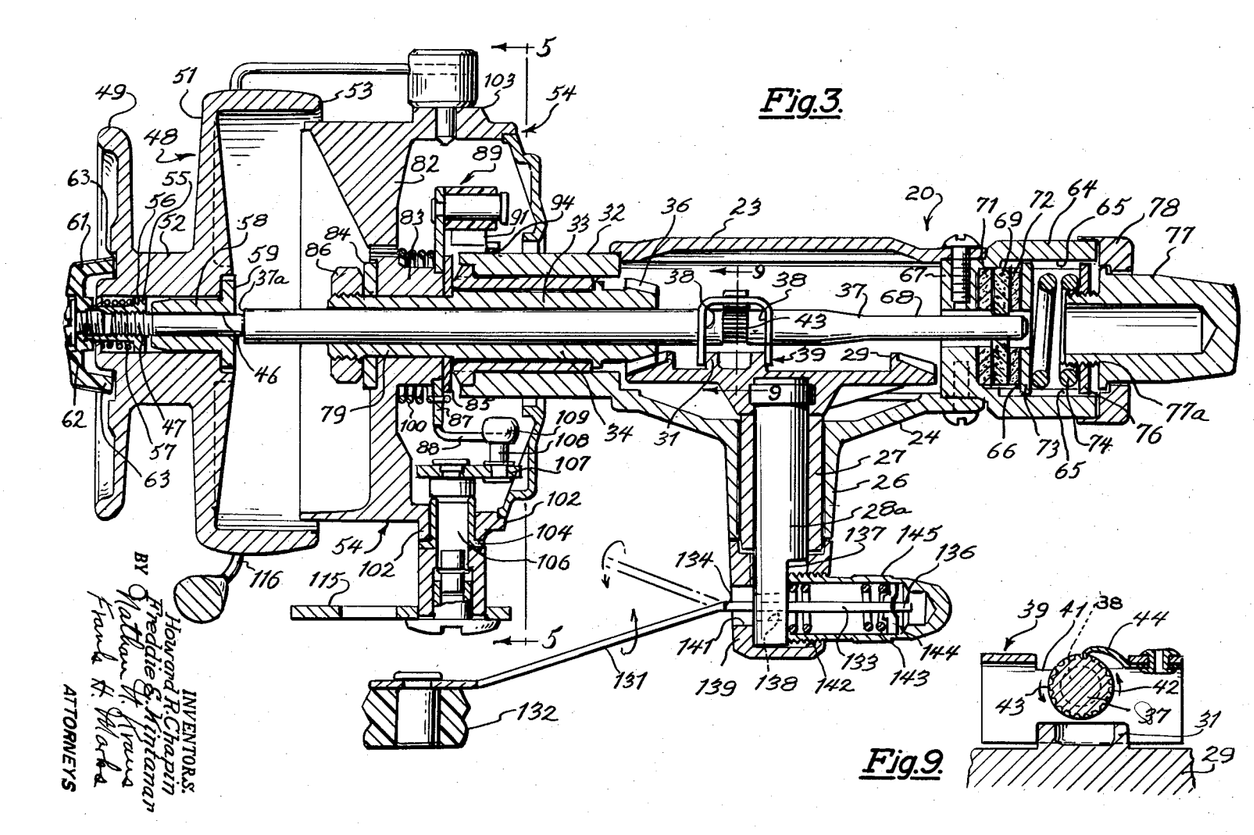
Fig. 3 is a longitudinal cross-sectional view taken substantially on line 3—3 of Fig. 1, but showing a modified crank construction.
Fig. 9 is a cross-sectional view taken on line 9—9 of Fig. 3.

The rearward flange 51 is provided with an integral rearwardly extending skirt portion 53 overlying a portion of the flyer 54 hereinafter to be described. The hub 52 is provided with chordal apertures through which one end of the line may be threaded for purposes of securing the same. Received within the bore of the hub 52 is a bushing 56 having internal threads and a flange 55 at one end thereof, the opposite end having a substantially double-D formation. A coil spring 57 is retained between the flange and an overhanging shoulder formed at the forward end of the bore of the hub. A bushing 58 is press-fitted into the bore of the hub 52 at the opposite end, said bushing having a flange 59, which is received in a recess in the rearward spool flange 51, and a double-D bore through which passes the milled portion 46 of the shaft 37, thereby keying the spool to the shaft while permitting axial movement of the spool on the shaft. An adjusting knob 61 provided with a central aperture, part of which has a double-D formation to receive the corresponding end of bushing 56, is secured to the said bushing by means of a slotted screw 62 which cooperates with the threaded bore of the bushing 56. The confronting faces of the knob 61 and spool 48 are provided with registering detents 63 which are maintained in engagement by the spring 57 to prevent inadvertent rotation of the knob relative to the spool. The end portion 47 of the shaft is in threaded engagement with the bushing 56. Accordingly the screw 62, knob 61 and bushing 56 may be rotated as a unit to effect axial adjustment of the spool relative to the shaft. Such adjustment may be required in order to effect a desired line-lay on the spool, as will be hereinafter explained.

The housing 20 is provided with an integral rearward extension 64 (Fig. 3) forming a cavity 66 for the reception of the braking means presently to be described. A wall 67 provided with a central aperture separates the main body chamber from the brake cavity. Through this aperture extends the rearward end portion of the spool shaft 37, said end portion being provided with opposed milled flats 68, and passing through a brake disk element 69 provided with a double-D aperture. The disk element is thereby keyed to the shaft, but the shaft may move axially relative to the disk element. On opposite sides of the disk element 69 are disposed cooperating brake disk elements 71 and 72, each of which has a central aperture affording clearance for the spool shaft 37. As will be seen by reference to Fig. 3, the disk element 71 abuts the wall 67, while a washer 73 is disposed contiguous to a face of the disk element 72. A coil spring 74 is contained within the brake cavity 66 and is confined between the washer 73 and a second washer 76 provided with a threaded aperture. The washers 73 and 76 each have diametrically opposed lug extensions received in longitudinal slots 65 provided in the cavity 66. An adjusting knob 77 having a left-hand threaded extension 77a cooperates with the washer 76 to effect axial adjustment of the washer and thereby adjustment of the spring pressure against the brake disk elements. The adjusting knob 77 is secured in position by a flanged member 78 secured, as with screws, to the extension 64 of the housing.

The forward portion of the tubular shaft 33 has a reduced diameter portion 79, the end of which terminates in a threaded portion provided with oppositely milled flats. Mounted on said shaft portion 79 is a flyer 54 which is of generally cylindrical construction and includes an intermediate wall portion 82 and a hub portion 83. The flyer is keyed to the shaft portion 79 through the means of a key washer 84 having radial lugs. The said washer cooperates with a correspondingly shaped recess in the forward face of the flyer, and a nut 86 on the end of the shaft serves to secure the flyer and key washer to the shaft.

Figure 5:
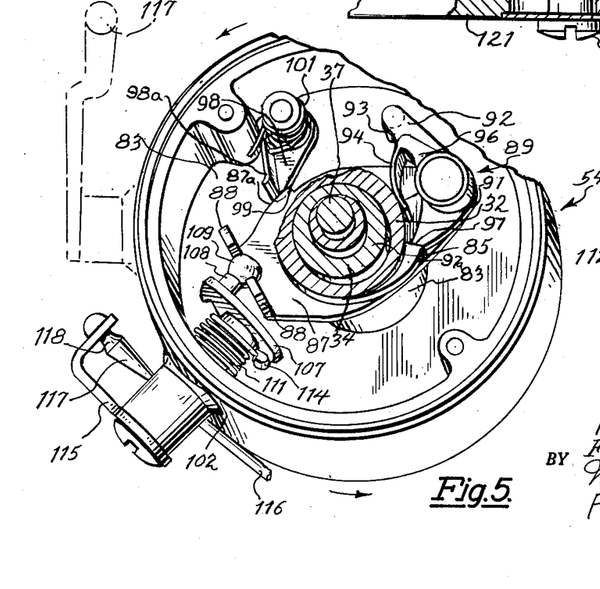
Fig. 5 is a perspective view looking in the direction of the arrows 5—5 of Fig. 3.

A generally oval-shaped flat actuating member 87 is carried on the hub portion 83 of the flyer and is confined between a shoulder on the hub portion and a washer 85 on the tubular shaft. One end of the plate member 87 is provided with a pair of spaced yoke arms 88 which are bent at right angles to the plane of the said member. On the opposite end of the plate member there is pivotally supported a pawl assembly 89 formed substantially as illustrated in Fig. 5. The said pawl assembly includes a pair of angularly related arms 91 and 92. The arm 91 terminates in a relatively sharp tooth, while the arm 92 is provided at its end with a rearwardly extending boss 93. An arcuate resilient finger 94 is formed integrally with an arm 96 partially overlying the arm 92. The said finger is disposed in a plane parallel to but spaced from the plane of the arms 91 and 92. The finger 94 and arms 92 and 96 of the pawl assembly comprise a greater mass than the arm 91 and therefore tend to bias the pawl assembly in a direction normally to cause the boss 93 to engage with the peripheral edge of the plate member 87. As will be seen clearly by reference to Figs. 3 and 5, the pawl assembly 89 is in planar alignment with the end portion of the housing extension 32 which is provided with a peripheral shoulder constituting a stop 97 which is adapted to be engaged by the arm 91, as will be hereinafter explained. The finger 94, which is disposed in a plane parallel to the arm 91, is adapted to frictionally engage the circular periphery of the housing extension 32. The arcuate form of the finger 94 is, in effect, a section of a circle which is tangent to the housing extension 32. Thus, as the pawl assembly 89 is caused to be revolved about the axis of the housing extension 32 in a clockwise direction, as viewed in Fig. 2, the arm 91 is urged into engagement with the stop 97 on the housing extension, effecting a rocking movement of the actuating member 87 relative to the flyer 54 for a fraction of a turn, as will be hereinafter more fully explained. When the pawl assembly 89 is revolved in an opposite direction in relation to the housing extension, the said pawl assembly is caused to rock in an opposite direction and to assume a non-operative or position of clearance in relation to the stop 97 on the housing extension.

A latch member 98 is pivotally mounted on the wall 82 and is provided at its end with a right-angle extension 98a adapted to engage the edge of the actuating member 87 which is formed with a shoulder 99. A torsion spring 101 serves to urge the latch member into engagement with the edge of the actuating member 87.

Figure 4:
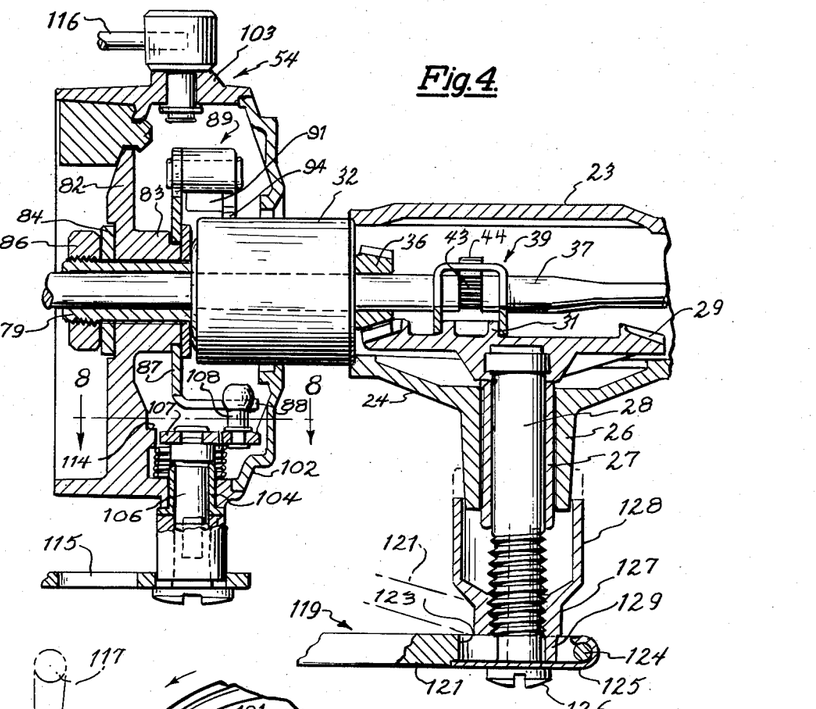
Fig. 4 is a fragmentary longitudinal cross-sectional view similar to Fig. 3, but showing modified structural features.
Figure 8:
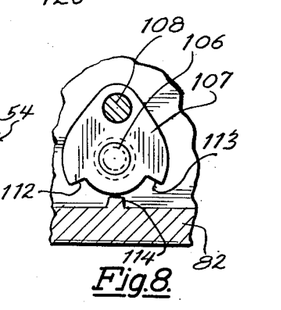
Fig. 8 is a cross-sectional view taken on line 8—8 of Fig. 4.

The flyer 54 is provided with diametrically opposed perforated bosses 102 and 103 (Figs. 3 and 4). In boss 102 there is received a bearing 104 in which is journalled a shaft 106 on the inner end of which is fixed a crank arm 107 shown more clearly in Fig. 8. Fixed to the said crank arm is a crank pin 108 normal to the plane of the arm and terminating in a ball portion 109. As will be clearly apparent by reference to Figs. 2 and 5, the ball portion 109 is received between the yoke arms 88 to afford an operative connection between the actuating member 87 and the shaft 106. A torsion spring 111 (Fig. 5) coaxially arranged on the shaft 106 normally serves to urge the crank arm 107 and correspondingly the shaft 106 in a particular direction, as will be hereinafter explained. The lower end of the crank arm, as illustrated clearly in Fig. 8, is formed with spaced shoulders 112 and 113 adapted to engage an abutment stop 114 formed on the wall 82 of the flyer, so as to limit the throw or angular movement of the crank arm in either direction of rotation. Secured to the shaft 106 is an arm 115 shaped substantially as illustrated in Fig. 6, and to the free end of said arm is secured a wire bail or line-engaging member 116, the other end of said bail being fixed in a shaft journalled in the opposite boss 103. The bail 116 adjacent its connection with the arm 115 is provided with a tapered lead portion 117 to guide the line onto a frictionless roller 118 carried on the bail.

A crank handle 119 (Figs. 1 and 4) is secured to the shaft 28 for rotating the same. The said handle comprises an elongated arm 121 having a finger-engaging knob 122 at one end thereof, the opposite end of said arm having a slot 123 of sufficient width to receive the end of the drive shaft 28. A pin 124 extends transversely of said slot at the end of the arm and is engaged by a plate member 125 having one end reversely bent to pivotally embrace the pin 124 and forming a hinge connection therewith. The said plate member is received within the slot and is adapted to lie flush with the outer surface of the arm 121. The plate member 125 is suitably keyed to the shaft 28 and is secured thereto by means of screw 126 in threaded engagement with the shaft. A nut 127 having an integral skirt portion 128 is in threaded engagement with the threaded outer surface of the shaft 28 and one end of the said nut is adapted to abut the arm 121 at the side marginal portions of the slot 123 as well as a transverse connecting portion 129 integral with the said marginal portions to lock the crank arm in the operative position indicated by the solid lines in Fig. 4. It will be apparent that, upon rotation of the nut 127 to cause the same to move axially towards the housing, the arm 121 may be pivoted to the dotted-line position, about the axis of the pin 124, to assume a collapsed position, thereby effecting a more compact arrangement for packaging or storage.

In the foregoing construction the plate member 125, which is preferably formed of relatively hard and strong material, serves to distribute the bearing load over a relatively large area of the crank arm, thereby permitting the same to be formed of relatively softer or weaker material. Accordingly, there are effected an increased service life of the crank arm and economies in manufacture of the same.

In the modified crank handle construction illustrated in Figs. 3 and 7, an arm 131, preferably formed of stamped sheet metal and shaped substantially as illustrated, is provided with a finger-engaging knob 132 at one end thereof. The opposite end portion 133 of said arm is of reduced width forming at the juncture opposed shoulders 134. The arm terminates in a portion of slightly increased width also forming opposed shoulders 136. The drive shaft 28a is modified from the structure of shaft 28, in that the end portion is provided with a milled flat surface 137 and a diametral aperture 138. A cap member 139 encloses the end of the shaft 28a and is provided with registering diametral apertures 141 and 142 aligned with the aperture 138 of the shaft. The arm portion 133 passes through all of the apertures and is retained by a compression spring 143 confined between the flat surface 137 of the shaft and a removable washer 144 abutting the shoulders 136. A cap member 145 encloses the end portion 133 of the arm and the spring 143. The said cap member is threaded at one end and is received in the aperture 142 which is also threaded. The cap member 145 is adapted to seat on the flat surface 137 and serves to secure the cap member 139 to the shaft 28a. The spring 143 urges the arm 131 in a direction to cause the shoulders 134 to engage in a slot 146 formed in the surface of the cap member 139 and intersecting the aperture 141. Thus, the arm 131 is substantially torsionally locked in a desired position. In order to move the arm 131 from the operative position shown by the solid lines in Fig. 3 to the collapsed or non-operative position indicated by the broken lines, tension is applied to the arm to overcome the pressure of spring 143 to disengage the shoulders 134 from the slot 146, permitting the arm to be rotated 180° to an opposite position. The shoulders are then re-engaged in the slot 146 to lock the arm 131 to the cap member 139.

In each of the foregoing crank handle structures the arm is in positive engagement with the drive shaft so that rotation of the shaft in a forward or reverse direction may be effected.

In use and operation, the reel is attached to a fishing rod at or relatively near the butt end of the rod with the longitudinal axis of the reel being disposed in parallel relation to the rod and with the spool 48 extending generally toward the rod tip. In this position the line is free to pass from the spool to the line guides carried on the rod. In order to condition the reel for making a cast, the line-engaging member 116 must first be shifted to non-line-engaging position, as illustrated by the broken lines in Figs. 2 and 5. Accordingly, the crank handle 119 is rotated in a clockwise direction, as viewed in Fig. 1, to cause the flyer 54 to rotate clockwise, as viewed in Fig. 2. The actuating member 87 will rotate simultaneously with the flyer, and in such movement the finger 94 drags on the peripheral surface of the housing extension 32 in such a manner as to cause the pawl arm 91 to rock so as to assume a position whereby it will engage the stop 97 on the housing extension (Figs. 2 and 5). When such engagement is effected, the rotation of the actuating member 87 is arrested and a somewhat greater force is required to be applied on the crank handle so as to overcome the torque of the spring 111, which normally urges the line-engaging member 116 to operative position, and to continue rotation of the flyer 54 relative to the actuating member 87. The latch member 98 associated with the flyer thus is carried to a position where it abuts the shoulder 99 on the periphery of the actuating member 87. This prevents the flyer 54 and actuating member 87 from returning to their original relative positions, thereby locking the line-engaging member in the non-line-engaging position illustrated by the broken lines in Figs. 2 and 5, as will be presently explained. Concurrently, the yoke arms 88 effect a rocking of the shaft 106 through the ball pin 109 and crank arm 107 to a point where the shoulder 113 on the lower end of the crank arm 107 is caused to abut a first face of stop 114 on the flyer. Such rocking of the shaft 106 causes the line-engaging member 116 to move to retracted or non-engaging line position below the spool 58 (see broken lines Figs. 2 and 5) and out of interference with the line or the crank handle. The latch member 98 thus serves to lock the line-engaging member in retracted position and accordingly the reel is conditioned for casting.

In the present embodiment the flyer 54 rotates approximately four revolutions for every revolution of the crank handle. Accordingly, the crank handle need be rotated in a reverse direction for a maximum of one-quarter of a revolution before the pawl arm 91 will engage with the stop 97. Such engagement, as hereinbefore explained, arrests the movement of the actuating member 87. From that point on, only an additional rotation of the crank handle for about 5 to 10 degrees is required to effect movement of the line-engaging member 116 from operative to inoperative or retracted position. Because the position of the stop 97 is fixed, it being integral with the reel housing, the actuating member 87 is arrested in its rotation, as above explained, always at the same point and accordingly always assumes the same position relative to the housing. Since the actuating member 87 influences the operation of the line-engaging member 116, the said member will always be caused to assume the same retracted position below the spool 48.

In order to retrieve the line, the crank handle is rotated in a counter-clockwise direction, as viewed in Fig. 1, thereby effecting rotation of the flyer 54 in a counter-clockwise direction, as viewed in Figs. 2 and 5. The latch member 98, in revolving about the housing extension 32, is thereby caused to be cammed out of engagement with the shoulder 99 on the plate by reason of the right angle extension 98a at the end of the latch member 98 engaging the camming surface 97a leading up to the stop 97 on the housing extension 32. The latch member 98 then comes to rest against the peripheral edge 87a of the actuating member 87. This edge, as will be seen in Fig. 2, is farther removed from the center of the actuating member 87 than the corresponding opposite side, because the actuating member in that region has greater width. Thus, the latch member 98 is maintained in an inoperative position while the flyer 54 is being rotated to retrieve the line. Concurrently, as the pawl assembly 89 is caused to revolve about the housing extension 32, the resilient finger 94 dragging on the peripheral surface of the housing extension 32 effects a rocking of the pawl arm 91 counter-clockwise, as viewed in Fig. 2, to a position of clearance away from engagement with any part of the housing extension 32. The boss 93 on the arm 92 abuts the edge of the actuating member 87 and limits the movement of the pawl assembly 89. Stored energy in the torsion spring 111 then effects rocking of the actuating member 87 to its initial position relative to the flyer 54. The shaft 106, being operatively connected to the actuating member 87 through the yoke arms 88, ball pin 109 and crank arm 107, is correspondingly rocked about its axis, thereby moving the line-engaging member 116 to operative or line-retrieving position, this position being determined when shoulder 112 on the crank arm 107 engages with the opposite face of stop 114 on the flyer.

While the torsion spring 111 is shown in Figs. 4 and 5 as being disposed concentric with shaft 106, it will be apparent that an equivalent spring 100 may be substituted therefor, the said spring being disposed concentrically with hub portion 83 of the flyer, as illustrated in Figs. 1 and 3, with one end of the spring being anchored in the flyer and the other end in the actuating member 87.

The pawl assembly 89 is asymmetrically unbalanced and so constructed as to be automatically rendered operative or inoperative, as desired, by the frictional drag of the finger 94 on the housing extension 32 according to the direction of movement of the said finger relative to the housing extension. Thus, the operation of the pawl assembly is substantially unaffected by gravity or centrifugal force, assuring effective operation of the reel even when the same is held in unusual positions.

Should the resilient finger 94 accidentally break off or be otherwise impaired, resulting in no frictional drag of the finger on the housing extension 32, the effect of gravity or centrifugal force on the pawl assembly 89, in the normal position of use of the reel, would be such as to cause engagement of arm 91 with stop 97, thereby insuring operation of the reel even under such adverse circumstances.

The structure hereinabove described permits digital manipulation of the line-engaging member 116 from retrieving to retracted or casting position without the use of the crank handle. The said line-engaging member, when manually rocked to such casting position, effects, through the medium of the shaft 106, crank arm 107 and ball pin 109, a rocking of actuating member 87 against the torsion of spring 111 to a point where the shoulder 113 engages the first face of stop 114 and the latch member 98 engages shoulder 99, thereby locking the line-engaging member in casting position. In order to retrieve the line, the crank handle is rotated in a counter-clockwise forward direction, as viewed in Fig. 1, and the mechanism is caused to function in the manner hereinbefore described.

In retrieving the line after casting it is only necessary to rotate the crank handle in a counter-clockwise direction, as viewed in Fig. 1. The line-engaging member 116 is automatically swung to line-pick-up position, and the line is guided upon the spool by the rotation of the member 116 around the spool 48. The axial reciprocation of the spool 48 results in laying the line substantially uniformly on the spool with the wraps or loops in crossed relation, so that the wraps around the spool are very unlikely to become snarled and the line freely and uniformly may strip from the spool when a cast is made.

Axial adjustment of the spool 48 relative to the line-engaging member 116 is readily effected by rotating the knob 61 in one direction or another to advance or retract the bushing 56 in relation to the shaft end 47. The spool 48 of course moves correspondingly with the bushing 56, the maximum rearward axial movement of the spool being determined by the bushing 59 abutting the shoulder 37a on the shaft 37. The cooperating detents 63 between the face of the adjusting knob 61 and the forward face of the spool prevent rotation of the knob relative to the spool and provide the means by which a desired adjustment may be readily calibrated. In the present embodiment each detent corresponds to an axial adjustment of approximately .005 in.

The foregoing axial adjustment means affords a number of advantages. The spool 48 may easily be removed and replaced by another spool having a line of different tensile characteristics. The said means also permits centering of the spool relative to the line-engaging means to compensate for variations in manufacturing tolerances and to adjust for different line diameters. Additionally, the adjustment means permits intentional non-centering of the line on the spool so as to obtain, if desired, instead of a level lay of wraps or loops, a substantially frusto-conical arrangement, tapering either forwardly or rearwardly as the case may be, to suit a flisherman's preference.

The braking mechanism illustrated in Fig. 3 affords means for permitting automatic unwinding of the spool when the line is in tension, as when a fish is being "played." This provides a safety feature to insure against line breakage, since it is possible to adjust the braking action to a desired degree just slightly below the breaking point of the line. Under such conditions tension on the line may cause the spool to rotate and unwinding of the line even while the crank handle is being turned in a retrieving direction.

It will be apparent that pressure upon the brake disks 69, 71 and 72 may be readily controlled by rotation of the adjusting knob 77 which serves to advance or retract the threaded nut 76 cooperating with the threaded end of the knob. Should the spool 48 be caused to rotate under the conditions above described, the reciprocating shaft 37 of course rotates simultaneously therewith. As a result of such rotation, the element 44 in cooperation with the serrations 43 on the shaft 37 will produce an audible signal or clicking sound, indicating to the fisherman that the brake is slipping. The clicking arrangement is effective under all conditions of operation, whether the shaft 37 is being reciprocated or remains axially stationary. However, no audible signal is produced until the spool is caused to rotate as above described.

Figures 10, 11, 12:
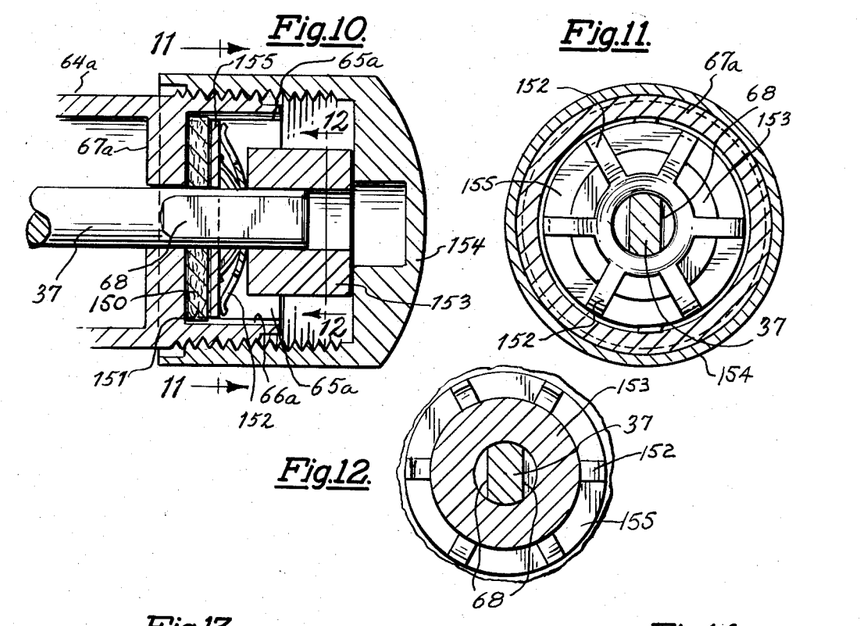
Fig. 10 is a longitudinal cross-sectional view of a modified embodiment of a brake assembly.
Fig. 11 is a cross-sectional view taken on line 11—11 of Fig. 10.
Fig. 12 is a cross-sectional view taken on line 12—12 of Fig. 10.

In Figs. 10–12 a slightly different form of braking mechanism is illustrated. In this modification, the rearward extension 64a of the housing is provided with an annular wall 67a through which extends the reciprocating spool shaft 37 having opposed flats 68 milled thereon. The end of the shaft 37 extends into the brake cavity 65a in which is located a friction disk 150 contiguous to the wall 67a. The said disk has diametrically opposed lugs 151 slidable in opposed longitudinal grooves 66a in extension 64a and a central aperture providing clearance for the shaft 37. A brake plate 155 provided with a central double-D aperture lies contiguous to the opposite face of the friction disk 150. The said brake plate is thereby keyed to the shaft 37 so as to rotate therewith, while friction disk 150 is keyed to extension 64a. A dished resilient spider element 152 is carried on the shaft 37 and the radial arms of said element engage against the brake plate 155. A pressure bushing 153 is carried on the end of the shaft 37 and abuts at one end the resilient spider and at the other end a hollow adjusting knob 154 provided with internal threads adapted to cooperate with threads on the rearward housing extension 64a. The knob 154 affords axial adjustment of the pressure bushing against the spider spring 152, thereby varying the pressure between the brake plate 151 and the disk 150 to effect a desired braking condition.

Figures 13, 14:
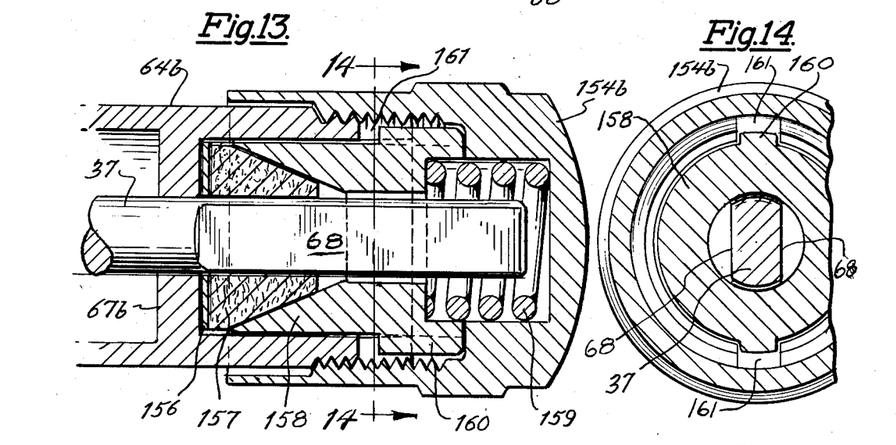
Fig. 13 is a longitudinal cross-sectional view of another modified embodiment of a brake assembly.
Fig. 14 is a cross-sectional view taken on line 14—14 of Fig. 13.

In Figs. 13 and 14 is illustrated another modified embodiment of the braking mechanism, which includes a rearward housing extension 64b similar to that just described and illustrated in Fig. 10 and an adjusting knob 154b in threaded engagement therewith. A fiber washer 156 lies between the wall 67b of the rearward extension of the housing and a frusto-conical braking element 157, preferably formed of powdered metal and provided with a central double-D bore to cooperate with the end of the reciprocating spool shaft 37 which is provided with milled flats 68. A complemental cooperating brake element 158 is carried on the shaft 37 and is urged into engagement with the braking element 157 by a coil spring 159. The said brake element 158 is formed preferably of a high impact moldable material such as Bakelite and includes two integral opposed lugs 160 slidable in opposed slots 161 in the extension 64b. The adjusting knob 154b abuts the spring 159. Rotation of the knob 154b in one direction or another effects adjustment in the spring pressure and affords adjustment of the braking action between the brake elements 157 and 158.

Figure 15:
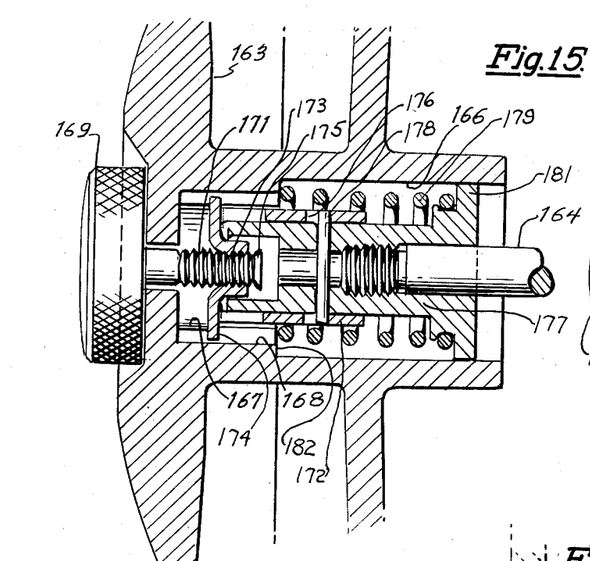
Fig. 15 is a longitudinal cross-sectional view of a modified spool construction and adjusting means therefor.
Figure 16:
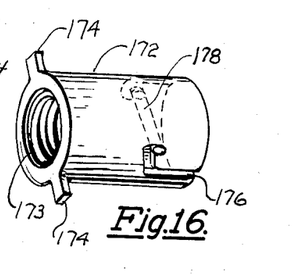
Fig. 16 is a perspective view of a detail shown in Fig. 15.

Fig. 15 illustrates a modified spool 163 and means for adjusting the same axially on the reciprocating shaft 164. The spool 163 includes a bore 166 having a reduced portion 167 which is provided with diametrically opposed longitudinally extending recesses 168. An adjusting knob 169 is provided with a threaded stem portion 171 which passes through an axial aperture in the spool 163 and extends into the bore portion 167. A member 172 of generally tubular form, shown more clearly in Fig. 16, has a threaded reentrant forward end 173 and a pair of diametrically opposed transversely extending lugs 174 struck out from the wall of the member. The said lugs are received in respective recesses 168, so as to key the member 172 to the spool 163 while affording relative axial movement. The threaded stem 171 is in threaded engagement with the reentrant end 173 of the member 172, and the end of the stem is upset as at 175, so as to prevent separation of the two parts. The opposite end of the member 172 is provided with opposed bayonet slots 176. A flanged cylindrical member 177 is provided with an axial bore which is intermediately threaded.

The end portion of shaft 164 is threaded and is in engagement with member 177, which is diametrically drilled to receive a pin 178, the oppositely projecting ends of which are received in opposed bayonet slots 176 provided in the member 172. The said arrangement serves to key the members 172 and 177 together and facilitates assembly of the parts. A coil spring 179 abuts at one end the flange 181 of the member 177 and at the other end the shoulder 182 formed at the juncture of the two bores 166 and 167 and serves to urge the spool 163 in a direction to the left, as viewed in Fig. 15, and into engagement with the adjusting knob 169. It will be apparent that, as the knob 169 is rotated in one direction or another, it is caused to move axially relative to the members 172 and 177, which are in fixed position in relation to the shaft 164. Accordingly, any axial movement of the adjusting knob 169 is imparted to the spool 163, resulting in a corresponding movement of the spool and effecting axial adjustment of the same. It will be understood that cooperating detents or corrugations may be provided on the contiguous surfaces of the knob 169 and spool 163.

Figure 17:
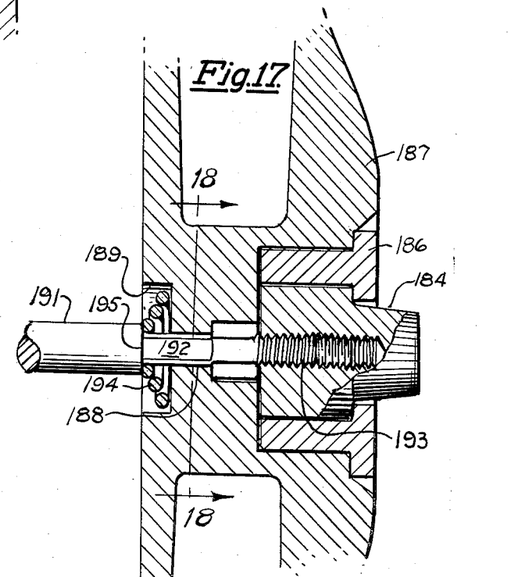
Fig. 17 is a longitudinal cross-sectional view of another modified spool construction and adjusting means therefor.
Figure 18:
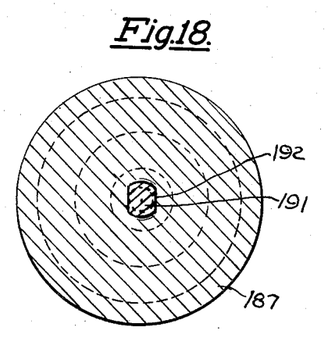
Fig. 18 is a cross-sectional view taken on line 18—18 of Fig. 17.

Fig. 17 illustrates another modified embodiment of a spool and adjusting means. In this embodiment an adjusting knob 184, shaped substantially as shown, is held captive by a flanged bushing 186 which is press-fitted into a recess in the forward face of the spool 187. The said spool is provided with an axial double-D aperture 188 and a circular recess 189 adjacent to and rearwardly of said aperture. The forward portion of the reciprocating spool shaft 191 is provided with opposed milled flats 192 and terminates in a threaded portion 193. The milled portion of the shaft 191 projects through the double-D aperture 188 of the spool 187, and the threaded portion 193 cooperates with the internal threads of the captive knob 184. A coil spring 194 of frusto-conical form abuts at one end the shoulder 195 of the shaft 191 and at the other end the face of the recess 189. Axial adjustment of the spool 187 relative to the shaft 191 is effected by rotating the captive knob in one direction or the other. The knob 184, when advanced on the threaded portion 193 of the shaft, moves the spool 187 to the left, as viewed in Fig. 17, against the pressure of the spring 194. When the knob 184 is turned in the opposite direction, the spring urges the spool 187 in a direction away from the shoulder of the shaft, or to the right, as viewed in Fig. 17.

Various changes coming within the spirit of our invention may suggest themselves to those skilled in the art. Hence, we do not wish to be limited to the specific embodiments shown and described or uses mentioned, but intend the same to be merely exemplary, the scope of our invention being limited only by the appended claims.

We claim:

1. A fishing reel comprising a housing adapted to be secured to a fishing rod and having a neck portion receiving a bearing member, said neck portion having an abutment thereon, a tubular driven shaft journalled in said bearing member, a spool shaft mounted for rotation and axial reciprocation within said driven shaft, adjustable braking means normally holding said spool shaft against rotation, a line-carrying spool fixed on said spool shaft, means for adjusting said spool axially of said shaft, a manually actuated driving shaft, an operating crank connected to said driving shaft, said driving shaft having driving connections with said driven shaft and said spool shaft, whereby said spool shaft is reciprocated as said driven shaft is rotated, a flyer keyed to said driven shaft and having a hub portion adjacent the neck portion of said housing, an actuating member rockably supported on said hub portion, a shaft member journalled in said flyer, a line-engaging member pivotally supported on said flyer and having one end fixed to said shaft member, a crank arm fixed on said shaft member, said crank arm having spaced shoulders arranged alternately to engage an abutment on said flyer to limit the throw of said crank arm in opposite directions, means operatively connecting said crank arm to said actuating member, a pawl pivotally supported on said actuating member and adapted to engage the abutment on said neck portion when said flyer is caused to be rotated in a reverse direction, means associated with said pawl and in frictional contact with said neck portion for rocking said pawl to cause the same to engage the abutment on said neck portion, said engagement arresting movement of said actuating member but permitting relative rotation of said flyer, thereby effecting rocking of said shaft member and simultaneous rocking of said line-engaging member to retracted position, spring means normally biasing said line-engaging member to line-winding position, and means associated and movable axially with said spool shaft for producing an audible signal as said spool is caused to rotate under the influence of tension on the line.

2. A fishing reel comprising a housing adapted to be secured to a fishing rod and having a neck portion receiving a bearing member, said neck portion having an abutment thereon, a tubular driven shaft journalled in said bearing member, a spool shaft mounted for rotation and axial reciprocation within said driven shaft, a line-carrying spool fixed on said spool shaft, a manually actuated driving shaft, an operating crank connected to said driving shaft, said driving shaft having driving connections with said driven shaft and said spool shaft whereby said spool shaft is reciprocated as said driven shaft is rotated, a flyer keyed to said driven shaft and having a hub portion adjacent the neck portion of said housing, an actuating member rockably supported on said hub portion, a shaft member journalled in said flyer, a line-engaging member pivotally supported on said flyer and having one end fixed to said shaft member, a crank arm supported on said shaft member, said crank arm having spaced shoulders arranged alternately to engage an abutment on said flyer to limit the throw of said crank in opposite directions, means operatively connecting said crank arm to said actuating member, a pawl pivotally supported on said actuating member and adapted to engage the abutment on said neck portion when said flyer is caused to be rotated in a reverse direction, means associated with said pawl and in frictional contact with said neck portion for rocking said pawl to cause the same to engage the abutment on said neck portion, said engagement arresting movement of said actuating member but permitting relative rotation of said flyer, thereby effecting rocking of said shaft member and simultaneous rocking of said line-engaging member to retracted position, spring means normally biasing said line-engaging member to line-winding position, and latch means arranged to releasably lock said actuating member in a position to correspond to the retracted position of said line-engaging member.

3. A fishing reel comprising a housing adapted to be secured to a fishing rod and having a substantially cylindrical neck portion receiving a bearing member, said neck portion having an abutment on the surface thereof, a tubular driven shaft journalled in said bearing member, a spool shaft mounted for rotation and axial reciprocation within said driven shaft, adjustable braking means normally holding said spool shaft against rotation, a line-carrying spool fixed on said spool shaft, means for adjusting said spool axially of said shaft, a manually actuated driving shaft, an operating crank connected to said driving shaft, said driving shaft having driving connections with said driven shaft and said spool shaft, whereby said spool shaft is reciprocated as said driven shaft is rotated, a flyer keyed to said driven shaft and having a hub portion adjacent the neck portion of said housing, an actuating member rockably supported on said hub portion and having a yoke normal to the plane of said member, a shaft member journalled in said flyer transversely of the axis thereof, a line-engaging member pivotally supported on said flyer and having one end connected to said shaft member, a crank arm fixed on said shaft member, a crank pin extending laterally of said arm and embraced by said yoke, said crank arm having spaced shoulders arranged alternately to engage an abutment on said flyer to limit the throw of said crank arm in opposite directions, a pawl pivotally supported on said actuating member and adapted to engage the abutment on said neck portion when said flyer is caused to be rotated in reverse direction, means associated with said pawl and in frictional contact with said neck portion for rocking said pawl to cause the same to engage the abutment on said neck portion, said engagement arresting movement of said actuating member but permitting a relative rotation of said flyer, thereby effecting rocking of said shaft member and corresponding movement of said line-engaging member to retracted position, spring means normally biasing said line-engaging member to line-winding position, means associated and movable axially with said spool shaft for producing an audible signal as said spool is caused to rotate under the influence of tension on the line, and latch means associated with said flyer for releasably locking said actuating member against movement relative to said flyer in one direction of rotation, thereby to releasably lock said line-engaging member in a retracted position.

4. A fishing reel comprising a housing adapted to be secured to a fishing rod and having a substantially cylindrical neck portion receiving a bearing member, said neck portion having an abutment on the surface thereof, a tubular driven shaft journalled in said bearing member, a spool shaft mounted for rotation and axial reciprocation within said driven shaft, a line-carrying spool fixed on said spool shaft, means for adjusting said spool axially of said shaft, a manually actuated driving shaft, an operating crank connected to said driving shaft, said driving shaft having driving connections with said driven shaft and said spool shaft, whereby said spool shaft is reciprocated as said driven shaft is rotated, a flyer keyed to said driven shaft and having a hub portion adjacent the neck portion of said housing, an actuating member rockably supported on said hub portion and having a yoke normal to the plane of said member, a shaft member journalled in said flyer transversely of the axis thereof, a line-engaging member pivotally supported on said flyer and having one end connected to said shaft member, a crank arm fixed on said shaft member, a crank pin extending laterally of said arm and embraced by said yoke, said crank arm having spaced shoulders arranged alternately to engage an abutment on said flyer to limit the throw of said crank arm in opposite directions, a pawl pivotally supported on said actuating member and adapted to engage the abutment on said neck portion when said flyer is caused to be rotated in reversed direction, means associated with said pawl and in frictional contact with said neck portion for rocking said pawl to cause the same to engage the abutment on said neck portion, said engagement arresting movement of said actuating member but permitting relative rotation of said flyer, thereby effecting rocking of said shaft member and corresponding movement of said line-engaging member to retracted position, spring means normally biasing said line-engaging member to line-winding position, and latch means associated with said flyer for releasably locking said actuating member against movement relative to said flyer in one direction of rotation, thereby to releasably lock said line-engaging member in a retracted position.

5. A fishing reel comprising a housing adapted to be secured to a fishing rod and having a neck portion receiving a bearing member, said neck portion having an abutment thereon, a tubular driven shaft journalled in said bearing member, a spool shaft mounted for rotation and axial reciprocation within said driven shaft, a line-carrying spool fixed on said spool shaft, means for adjusting said spool axially of said shaft, a manually actuated driving shaft, an operating crank connected to said driving shaft, a gear fixed on said driving shaft and having an eccentric boss, a yoke member associated with said spool shaft and embracing said boss and affording reciprocation of said spool shaft upon rotation of said driving shaft, a pinion associated with said driven shaft and operatively engaged with said gear and affording rotation of said driven shaft upon rotation of said driving shaft, a flyer keyed to said driven shaft and having a hub portion adjacent the neck portion of said housing, an actuating member rockably supported on said hub portion and having a yoke normal to the plane of said member, a shaft member journalled in said flyer transversely of the axis thereof, a line-engaging member pivotally supported on said flyer and having one end connected to said shaft member, a crank arm fixed on said shaft member, a crank pin extending laterally of said arm and embraced by said last-mentioned yoke, said crank arm having spaced shoulders arranged alternately to engage an abutment on said flyer to limit the throw of said crank arm in opposite directions, a pawl pivotally supported on said actuating member and adapted to engage the abutment on said neck portion when said flyer is caused to be rotated in reverse direction, means associated with said pawl and in frictional contact with said neck portion for rocking said pawl to cause the same to engage the abutment on said neck portion, said engagement arresting movement of said actuating member but permitting relative rotation of said flyer, thereby effecting rocking of said shaft member and corresponding movement of said line-engaging member to retracted position, spring means normally biasing said line-engaging member to line-winding position, and latch means associated with said flyer for releasably locking said actuating member against movement relative to said flyer in one direction of rotation, thereby releasably locking said line-engaging member in retracted position.

6. In a fishing reel, a body having a neck portion of substantially circular cross-section, said neck portion having a camming portion on the surface thereof terminating in an abutment, a tubular driven shaft journalled in said neck portion, a spool shaft mounted for axial reciprocation within said driven shaft, means affording connection with said spool shaft and said driven shaft, whereby the spool shaft is reciprocated as said driven shaft is rotated, a flyer keyed to said driven shaft and having a hub portion adjacent said neck portion, a platelike actuating member rockably supported on said hub portion, said member having a yoke at one end normal to the plane thereof, a pawl pivotally supported on said actuating member opposite said yoke, said actuating member having a shoulder formed in an edge thereof intermediate said yoke and pawl, a shaft member journalled in said flyer transversely thereof, a line-engaging member secured to said shaft member, a crank arm fixed on said shaft member and having an extension projecting laterally therefrom and embraced by said yoke, whereby rocking of said actuating member relative to said flyer will effect simultaneous rocking of said shaft member, said pawl having a resilient finger adapted to drag on the surface of said neck portion, a latch pivoted on said flyer and normally biased in a direction to engage an edge of said actuating member, spring means normally biasing said shaft member and line-engaging member to line-winding position, stop means for limiting the throw of said crank arm in either direction, said finger when said flyer is caused to be rotated in one direction corresponding to reverse rotation of the flyer effecting pivotal movement of said pawl in a direction to cause the same to engage said abutment, thereby arresting movement of said actuating member and effecting rocking thereof relative to said flyer with corresponding rocking of said shaft member to position said line-engaging member in retracted position, the continued rotation of said flyer disposing said latch in a position to engage the shoulder on the actuating member to lock the same against further movement, thereby releasably locking said line-engaging member in retracted position, said flyer when rotated in an opposite direction corresponding to line-retrieving rotation carrying said latch into engagement with said camming portion, thereby effecting release of said latch from engagement with said shoulder and permitting the spring means to rock said shaft member to position said line-engaging member in line-winding position.

7. In a fishing reel, a body having a neck portion of substantially circular cross-section, said neck portion having a camming portion on the surface thereof terminating in an abutment, a driven shaft journalled in said neck portion, means for driving said driven shaft, a flyer keyed to said driven shaft and having a hub portion adjacent said neck portion, a platelike actuating member rockably supported on said hub portion, said member having a bifurcated end normal to the plane thereof, a pawl element pivotally supported on said actuating member opposite said bifurcated end, said actuating member having a shoulder formed in an edge thereof intermediate said bifurcated end and pawl, a shaft member journalled in said flyer transversely thereof, a line-engaging member secured to said shaft member, a crank arm fixed on said shaft member and having an extension projecting laterally therefrom and disposed between the furcations of said actuating member, whereby rocking of said actuating member relative to said flyer will effect simultaneous rocking of said shaft member, said pawl having a friction element adapted to drag on the surface of said neck portion, a latch pivoted on said flyer and normally biased in a direction to engage an edge of said actuating member, spring means normally biasing said shaft member and line-engaging member to line-winding position, stop means for limiting the throw of said crank arm in either direction, said finger when said flyer is caused to be rotated in one direction corresponding to reverse rotation of the flyer effecting pivotal movement of said pawl in a direction to cause the same to engage said abutment, thereby arresting movement of said actuating member and continued rotation of said flyer effecting rocking relative to said actuating member with corresponding rocking of said shaft member to position said line-engaging member in retracted position, said continued rotation of said flyer disposing said latch in a position to engage the shoulder on the actuating member to lock the same against further movement, thereby releasably locking said line-engaging member in retracted position, said flyer when rotated in an opposite direction corresponding to line-retrieving rotation carrying said latch into engagement with said camming portion, thereby effecting release of said latch from engagement with said shoulder and permitting the spring means to rock said shaft member to position said line-engaging member in line-winding position.

8. In a fishing reel, a body having a neck portion of substantially circular cross-section, said neck portion having a camming portion on the surface thereof terminating in an abutment, a tubular driven shaft journalled in said neck portion, a spool shaft mounted for axial reciprocation within said driven shaft, means for driving said driven shaft, a flyer keyed to said driven shaft and having a hub portion adjacent said neck portion, a platelike actuating member rockably supported on said hub portion, said member having a yoke at one end normal to the plane thereof, a pawl element pivotally supported on said actuating member opposite said yoke, said actuating member having a shoulder formed in an edge thereof intermediate said yoke and pawl, a shaft member journalled in said flyer transversely thereof, a line-engaging member secured to said shaft member, a crank arm fixed on said shaft member and having an extension projecting laterally therefrom and embraced by said yoke, whereby rocking of said actuating member relative to said flyer will effect simultaneous rocking of said shaft member, a latch pivoted on said flyer and normally biased in a direction to engage an edge of said actuating member, spring means normally biasing said shaft member and line-engaging member to line-winding position, stop means for limting the throw of said crank arm in either direction, said pawl element being asymmetrically unbalanced such that when said flyer is caused to be rotated in one direction corresponding to reverse rotation of the flyer it will be caused to pivot in a direction to engage said abutment, thereby arresting movement of said actuating member and effecting rocking of said flyer relative thereto with corresponding rocking of said shaft member to position said line-engaging member in retracted position, the continued rotation of said flyer disposing said latch in a position to engage the shoulder on the actuating member to lock the same against further movement, thereby releasably locking said line-engaging member in retracted position, said flyer when rotated in an opposite direction corresponding to line-retrieving rotation carrying said latch into engagement with said camming portion, thereby effecting release of said latch from engagement with said shoulder and permitting the spring means to rock said shaft member to position said line-engaging member in line-winding position.

References Cited in the file of this patent

UNITED STATES PATENTS

| Number | Name | Date |
|---|---|---|
| 1,276,981 | Smith | Aug. 27, 1918 |
| 1,293,054 | Dowdall | Feb. 4, 1919 |
| 1,307,960 | Curtis | June 24, 1919 |
| 1,922,303 | Kinzbach | Aug. 15, 1933 |
| 1,972,778 | Kennett | Sept. 4, 1934 |
| 2,013,492 | Gorton | Sept. 3, 1935 |
| 2,344,209 | Lowe | Mar. 14, 1944 |
| 2,498,987 | Duncan | Feb. 28, 1950 |
| 2,615,647 | Palmer | Oct. 28, 1952 |
| 2,665,856 | Shakespeare et al. | Jan. 12, 1954 |
| 2,713,463 | Sarah | July 19, 1955 |
| 2,777,645 | Wood | Jan. 15, 1957 |
| 2,783,952 | Clay | Mar. 5, 1957 |